US 008322606B2

(12) United States Patent (10) Patent No.: US 8,322,606 B2
Ong (45) Date of Patent: Dec. 4, 2012

(54) ELECTRONIC CREDIT CARD—ECC

(76) Inventor: Yong Kin (Michael) Ong, City Beach (AU)

(*) Notice: Subject to any disclaimer, the term of this patent is extended or adjusted under 35 U.S.C. 154(b) by 271 days.

(21) Appl. No.: 12/466,878

(22) Filed: May 15, 2009

(65) Prior Publication Data

US 2009/0272796 A1    Nov. 5, 2009

Related U.S. Application Data

(63) Continuation-in-part of application No. 11/897,089, filed on Aug. 28, 2007, now Pat. No. 7,533,828, which is a continuation of application No. 10/203,870, filed as application No. PCT/AU01/00170 on Feb. 16, 2001, now Pat. No. 7,278,581.

(30) Foreign Application Priority Data

Feb. 16, 2000 (AU) ........................................ PQ5644

(51) Int. Cl.
*G06K 5/00* (2006.01)
(52) U.S. Cl. ......... 235/380; 235/379; 235/487; 235/492
(58) Field of Classification Search ............ 235/379, 235/380, 487, 492; 902/25–26; 705/39, 705/41, 64; 340/5.4, 5.41, 5.42; 382/117, 382/124
See application file for complete search history.

(56) References Cited

U.S. PATENT DOCUMENTS

| 4,277,837 | A |   | 7/1981 | Stuckert ......................... 364/900 |
|---|---|---|---|---|
| 4,453,074 | A |   | 6/1984 | Weinstein ...................... 235/380 |
| 4,614,861 | A | * | 9/1986 | Pavlov et al. ................. 235/380 |
| 4,625,276 | A |   | 11/1986 | Benton et al. ................. 364/408 |
| 4,697,072 | A |   | 9/1987 | Kawana ......................... 235/380 |
| 4,701,601 | A | * | 10/1987 | Francini et al. ................ 235/449 |
| 4,755,940 | A |   | 7/1988 | Brachtl et al. ................ 364/408 |
| 4,766,293 | A | * | 8/1988 | Boston ............................ 705/41 |
| 5,097,115 | A |   | 3/1992 | Ogasawara et al. ........... 235/380 |
| 5,130,519 | A |   | 7/1992 | Bush et al. ..................... 235/380 |
| 5,157,726 | A |   | 10/1992 | Merkle et al. ................... 380/23 |
| 5,180,902 | A |   | 1/1993 | Schick et al. ................. 235/380 |
| 5,225,667 | A |   | 7/1993 | Furuta et al. .................. 235/492 |
| 5,428,684 | A |   | 6/1995 | Akiyama et al. ................ 380/25 |
| 5,539,825 | A |   | 7/1996 | Akiyama et al. ................ 380/24 |
| 5,590,038 | A | * | 12/1996 | Pitroda .......................... 705/41 |
| 5,623,552 | A |   | 4/1997 | Lane ............................. 382/124 |
| 5,737,423 | A |   | 4/1998 | Manduley ....................... 380/25 |
| 5,884,271 | A |   | 3/1999 | Pitroda ............................ 705/1 |
| 5,907,142 | A |   | 5/1999 | Kelsey ......................... 235/380 |
| 5,955,961 | A | * | 9/1999 | Wallerstein ................... 340/5.4 |
| 6,032,857 | A |   | 3/2000 | Kitagawa ...................... 235/379 |
| 6,098,055 | A |   | 8/2000 | Watanabe ....................... 705/73 |
| 6,142,369 | A |   | 11/2000 | Jonstromer ................... 235/380 |
| 6,188,309 | B1 | * | 2/2001 | Levine ......................... 340/5.66 |
| 6,257,486 | B1 |   | 7/2001 | Teicher et al. ................ 235/380 |

(Continued)

FOREIGN PATENT DOCUMENTS

DE    19755568    6/1999

(Continued)

*Primary Examiner* — Kristy A Haupt
(74) *Attorney, Agent, or Firm* — Ballard Spahr LLP

(57) ABSTRACT

An Electronic Credit Card (ECC) including a user verifier for verifying a user's identity, a code generator for generating a unique authorization code for the user, storage of the user's account details for use in an electronic funds transfer, and a communicator for non-visual communication of the account details and the authorization code to a transaction station.

42 Claims, 6 Drawing Sheets

A drawing of ECC communications link to Teller Machines, ATMs, EFTPOS and Host Computer. Drawing is not to scale.

U.S. PATENT DOCUMENTS

| | | | |
|---|---|---|---|
| 6,510,983 B2 | 1/2003 | Horowitz et al. | 235/380 |
| 6,607,127 B2 | 8/2003 | Wong | 235/451 |
| 7,278,581 B2 * | 10/2007 | Ong | 235/492 |
| 7,293,717 B1 | 11/2007 | Pathmasuntharan | 235/492 |
| 7,533,828 B2 * | 5/2009 | Ong | 235/492 |
| 2001/0034717 A1 * | 10/2001 | Whitworth | 705/64 |

FOREIGN PATENT DOCUMENTS

| | | |
|---|---|---|
| EP | 0097110 | 12/1983 |
| EP | 0590224 | 4/1994 |
| EP | 0793186 | 9/1997 |
| EP | 0805424 | 11/1997 |
| FR | 2581776 | 11/1986 |
| GB | 1369537 | 10/1974 |
| GB | 2204971 | 11/1988 |
| GB | 2256170 | 12/1992 |
| GB | 2310069 | 8/1997 |
| GB | 2338381 | 12/1999 |
| GB | 2346239 | 8/2000 |
| JP | 60-209871 | 10/1985 |
| JP | 9044619 | 2/1997 |
| JP | 11167553 | 6/1999 |
| RU | 2060540 | 5/1996 |
| WO | WO 94/11849 | 5/1994 |
| WO | WO 96/05576 | 2/1996 |
| WO | WO 97/04609 | 2/1997 |
| WO | WO 97/15032 | 4/1997 |
| WO | WO 98/09227 | 3/1998 |
| WO | WO 99/31621 | 6/1999 |
| WO | WO 00/45247 | 8/2000 |
| WO | WO 00/46710 | 8/2000 |

* cited by examiner

Figure 1: A drawing of ECC physical form covering SAC with PIN control using a combination of infra-red, radio frequency and magnetic induction telecommunication devices. Drawing is not to scale.
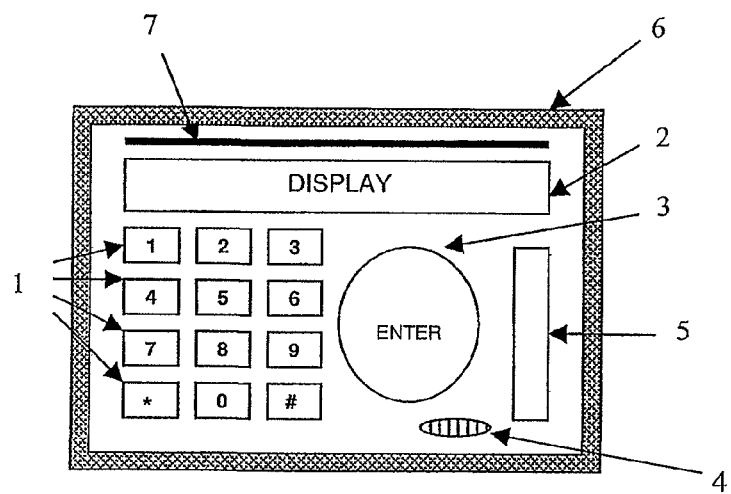

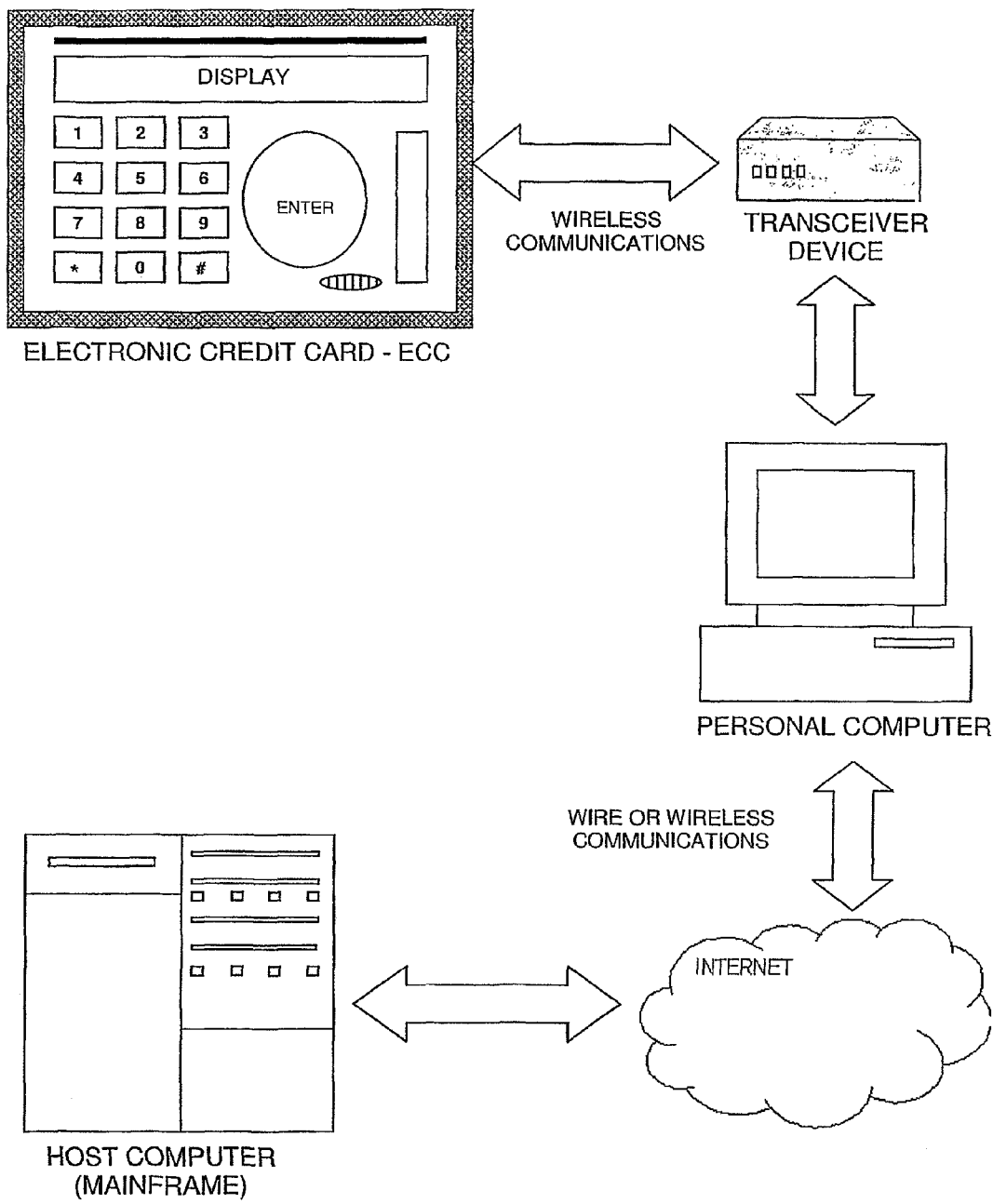
Figure 2: A drawing of ECC communications link to PC and Mainframe Computer. Drawing is not to scale.

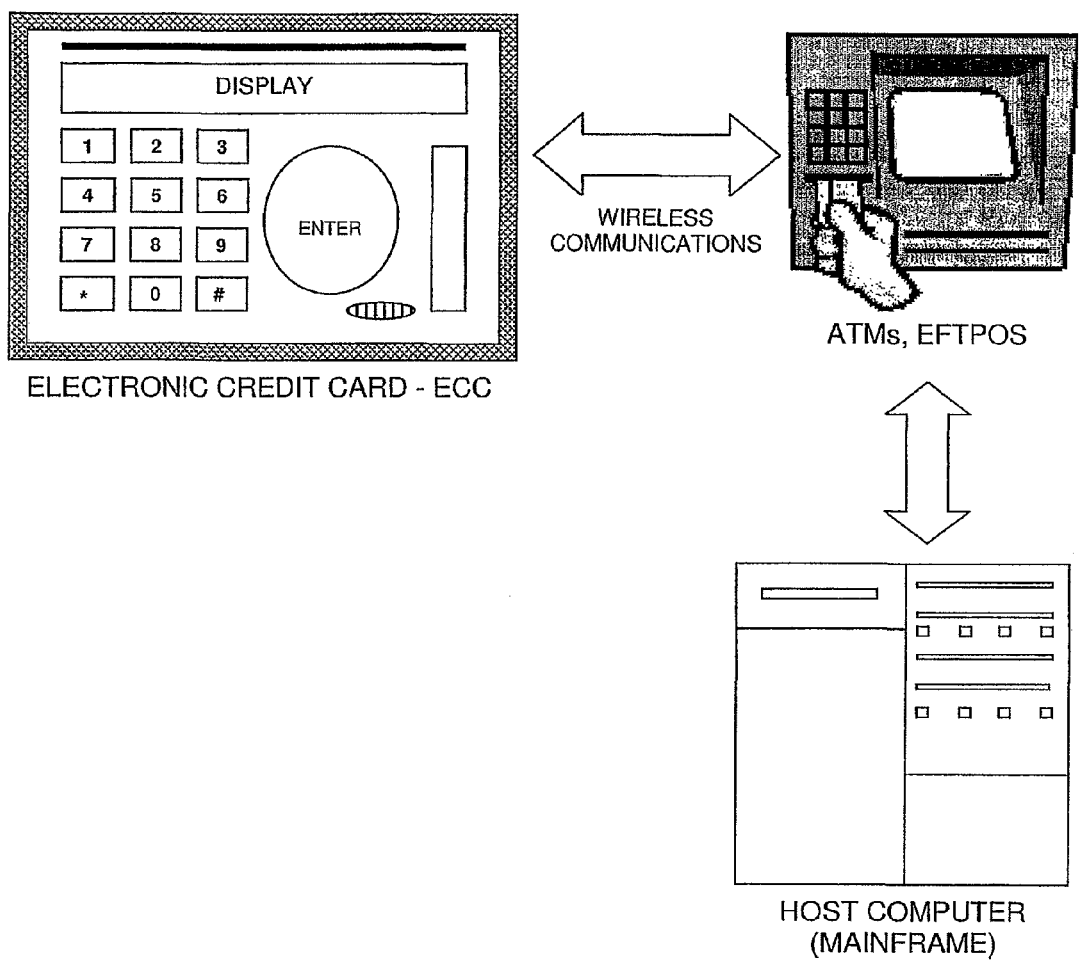
Figure 3: A drawing of ECC communications link to Teller Machines, ATMs, EFTPOS and Host Computer. Drawing is not to scale.

A view of ECC physical form is shown at Figure 4 to 12:

Figure 4: A drawing of ECC physical form covering SAC with PIN control using infrared telecommunication device. Drawing is not to scale.

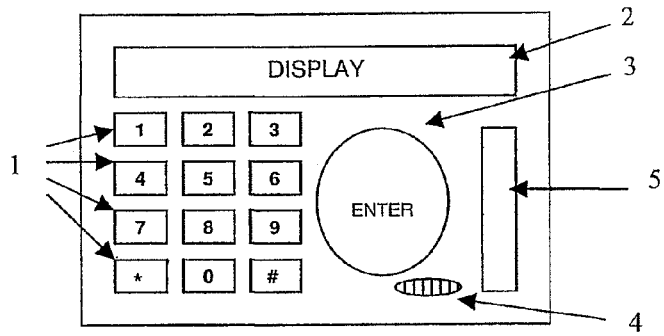

Figure 5: A drawing of ECC physical form covering SAC with PIN control using radio frequency telecommunication device. Drawing is not to scale

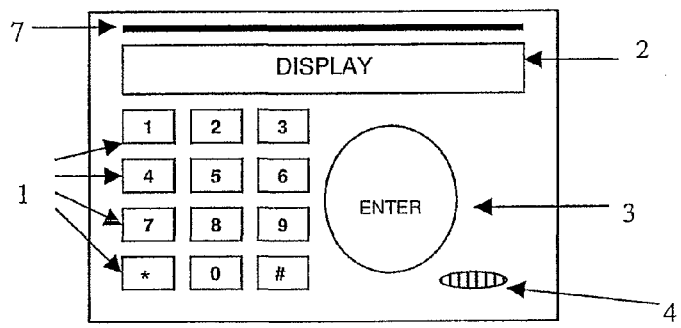

Figure 6: A drawing of ECC physical form covering SAC with PIN control using magnetic induction telecommunication device. Drawing is not to scale.

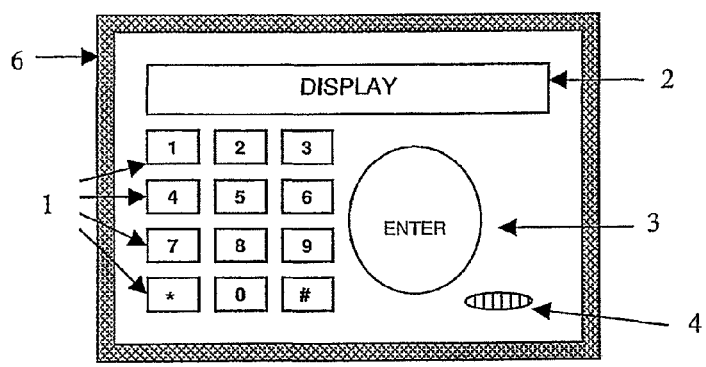

Figure 7: A drawing of ECC physical form covering SAC with PIN control using wire contact telecommunication device. Drawing is not to scale.

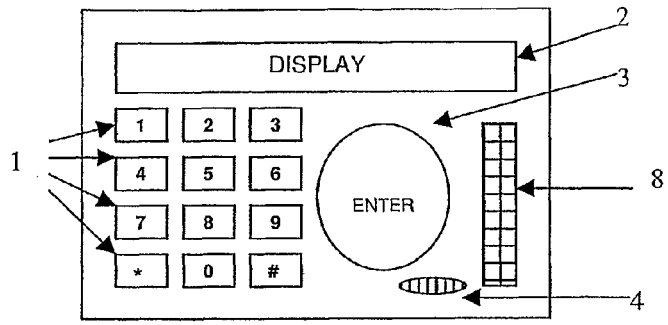

Figure 8: A front view drawing of ECC physical form covering SAC with PIN control using magnetic strip telecommunication device. Drawing is not to scale.

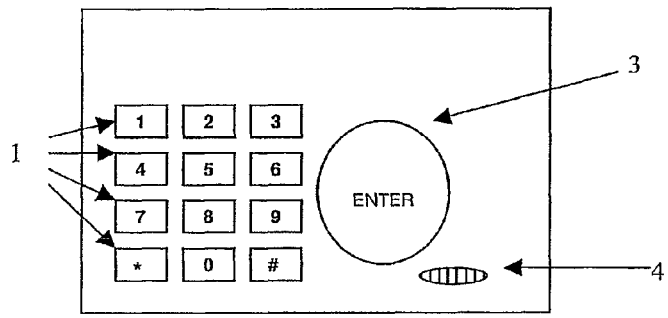

Figure 9: A rear front view drawing of ECC physical form covering SAC with PIN control using magnetic strip telecommunication device. Drawing is not to scale.

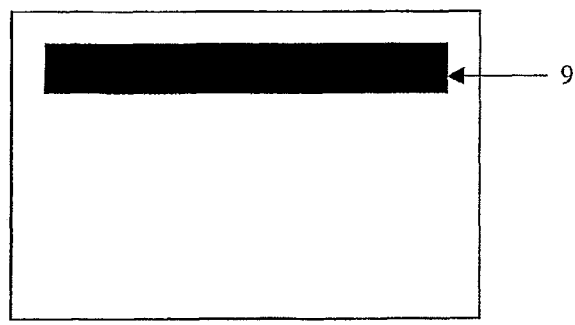

Figure 10: A drawing of ECC physical form covering SAC with PIN control using a combination of infra-red, radio frequency and magnetic induction telecommunication devices. Drawing is not to scale.

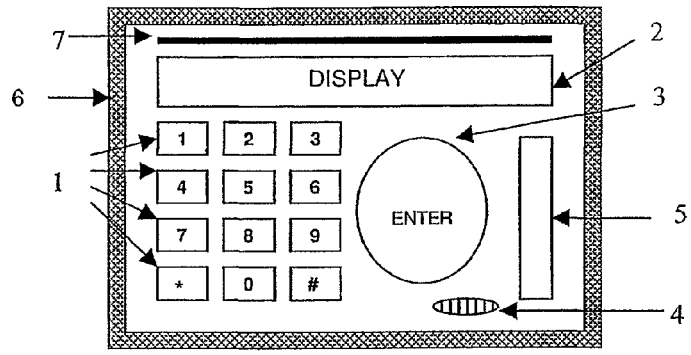

Figure 11: A drawing of ECC physical form covering SAC with finger print scanner pad with a combination of infra-red, radio frequency and magnetic induction telecommunication devices. Drawing is not to scale.

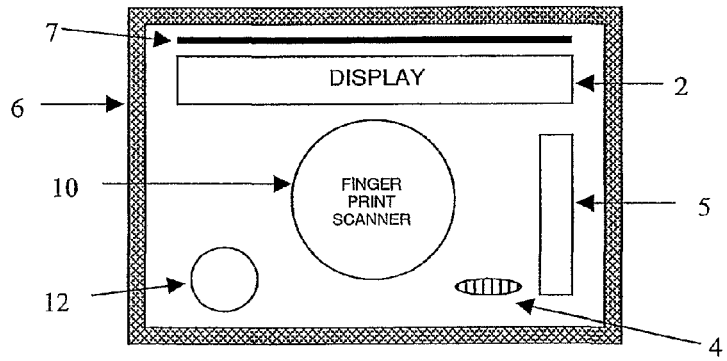

Figure 12: A drawing of ECC physical form covering SAC with eyeball retina scanner pad with a combination of infra-red, radio frequency and magnetic induction telecommunication devices. Drawing is not to scale.

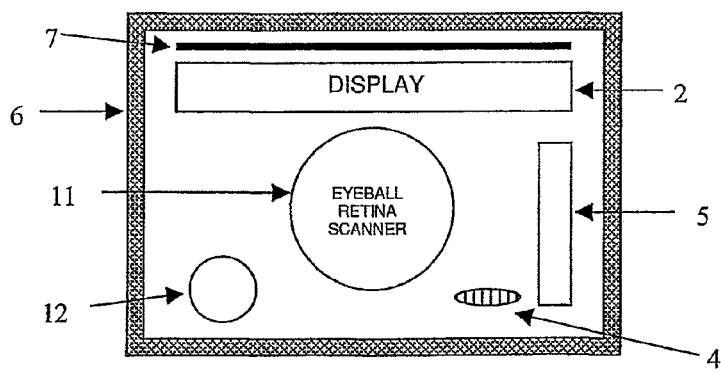

ELECTRONIC CREDIT CARD—ECC

CROSS REFERENCE TO RELATED APPLICATION

This application is a continuation-in-part of U.S. Utility application Ser. No. 11/897,089, filed Aug. 28, 2007, now U.S. Pat. No. 7,533,828, issued May 19, 2009, which is a continuation of U.S. Utility application Ser. No. 10/203,870, filed Oct. 15, 2002, now U.S. Pat. No. 7,278,581, issued Oct. 9, 2007, which is a 371 of international application PCT/AU01/00170, filed Feb. 16, 2001, which claims priority to Australian patent application no. PQ5644 filed Feb. 16, 2000. The aforementioned applications are hereby incorporated herein by reference in their entirety.

FIELD OF THE INVENTION

The present invention relates to an electronic credit card providing secure controlled and reliable transaction of funds.

BACKGROUND OF THE INVENTION

The present credit card environment and systems have the following shortfalls:
- When a credit card is reported lost or stolen by a holder he or she has to contact the company or organisation that issued the card to cancel the card in order to prevent illegal transactions. Cancellation may not occur immediately if the holder is unaware that his or her card is missing.
- The present security measures undertaken by credit card companies and/or organisations through the use of "smart card" technology are inadequate to prevent fraud. Similarly the use of holographic images on credit cards does not eliminate fraud either.
- Use of a signature as a validation control may be overlooked and can be forged.
- The technology behind current credit cards is outdated and not suitable for a secure transaction via the Internet.
- It does not prevent hackers who penetrate "secure websites" to make use of credit card details for fraud.
- Giving a merchant credit card details is like giving him or her a "signed blank cheque". Credit companies or organisations are not efficient when dealing with insincere merchants.
- The customer must rely on trusting the merchant not to misuse the credit card details.

The present invention seeks to provide an electronic credit card that attempts to overcome the shortfalls of the present credit card system.

SUMMARY OF THE PRESENT INVENTION

In accordance with the present invention there is provided an electronic credit card comprising at least:
a user verifier for verifying the identity of a user;
a code generator for generating a unique authorization code when the user's identity is verified;
a storage for storing the user's account details for use in an electronic funds transfer transaction; and
a communicator for non visually communicating account details of the user and the authorization code to a transaction station in order to facilitate an electronic funds transfer transaction.

In an embodiment the electronic credit card includes a timer means for ending the verification of the user's identity after a period of time.

In an embodiment the electronic credit card includes a disabler for disabling use of the electronic credit card under certain conditions. Typically the conditions include circumstances when a predetermined number of attempts verify the identity of the user fail.

Preferably the disabler operates when activated remotely by an issuer of the electronic credit card or other authority, so that the electronic credit can not be ordinarily re-enabled.

In one embodiment, the unique authorization code is generated in synchronisation with the transaction station.

In one embodiment the communicator is configured such that the unique authorization code is secretly communicated to the transaction station such that it is not communicated to a merchant.

In one embodiment the code generator is configured to generate the unique authorization code by combining a unique transaction identifier with a user identifier.

In one embodiment the user identifier is a personal identification number.

In another embodiment the user identifier is derived from a biometric reading of the user.

Preferably the storage means is arranged to store a financial limit for transactions that the electronic credit card may be used for. Preferably the financial limit is provided to the transaction station by the communicator. Alternatively the electronic credit card includes a processor for keeping track of the use of the electronic credit card, wherein the processor is configured so that the electronic credit card will not generate or communicate the authorization code if the financial limit is exceeded. Alternatively the financial limit may be retrieved via the transaction station from a financial institution.

Preferably the storage is arranged to store more than one set of account details.

Preferably the storage is arranged to store electronic cash and the communicator is arranged to facilitate the use of the electronic cash stored in the storage means if the user identification is verified.

In an embodiment the user verifier includes a keypad for entry of a personal identification number (PIN), and a PIN verifier to authenticate the identity of the user. In another embodiment the user verifier includes a fingerprint reader for reading a fingerprint of the user and a fingerprint verifier for verifying the identity of the user from the user's fingerprint. In yet another embodiment the user verifier includes a retina scanner for scanning a retina pattern and a retina pattern verifier for verifying the identity of the user from the scanned retina pattern.

In one embodiment the communicator includes an infra red transmitter. In another embodiment the communicator includes a radio frequency transmitter. In yet another embodiment the communicator includes a magnetic induction transfer device. In yet a further embodiment the communicator includes a wire contact.

In an embodiment the storage and communicator are partly in the form of a magnetic strip for storing account details and communication of the account details to the transaction station.

In an embodiment the communicator includes a telephone network interface.

In an embodiment the storage stores transaction details and a processor is provided to calculate the funds available.

In one form the electronic credit card is incorporated into another device. In an embodiment a method of conducting an electronic funds transfer transaction using an electronic card comprises:

receiving an input from a user at the electronic card;
verifying the identity of the user from the input;
generating a unique transaction identifier when the user's identity is verified;
communicating the unique transaction identifier and the user's account details stored in the electronic card from the electronic card to a transaction station in a non visual form.

In an embodiment an electronic credit card comprises:

an input device for receiving a user input to enable verifying a user's identity;
an output device for non visually communicating with a transaction station;
a processor configured to generate a unique authorization code when the user's identity is verified; the processor configured to retrieve a stored user's account details for use in an electronic funds transfer transaction; and the processor also configured to transfer the generated unique authorization code and user account details to the transaction station via the output device.

DETAILED DESCRIPTION OF THE INVENTION

In order to provide a better understanding, preferred embodiments will now be described in detail, by way of example only, with reference to the accompanying drawings, in which:

FIG. 1 is a schematic representation of an electronic credit card in accordance with the present invention;

FIG. 2 is a schematic representation of communication between an electronic credit card of FIG. 1 with a personal computer and thus and in turn via computer network with a host computer;

FIG. 3 is a schematic representation between electronic credit card of FIG. 1 and an ATM or EFTPOS terminal and a host computer;

FIG. 4 is an alternative embodiment of an electronic credit card in accordance with the present invention;

FIG. 5 is a further alternative embodiment of an electronic credit card in accordance with the present invention;

FIG. 6 is a further alternative embodiment of an electronic credit card in accordance with the present invention;

FIG. 7 is a further alternative embodiment of an electronic credit card in accordance with the present invention;

FIG. 8 is a further alternative embodiment of an electronic credit card in accordance with the present invention;

FIG. 9 is a rear view of an electronic credit card in accordance with the present invention having a magnetic strip communication device;

FIG. 10 is a further alternative embodiment of an electronic credit card in accordance with the present invention;

FIG. 11 is a further alternative embodiment of an electronic credit card in accordance with the present invention; and FIG. 12 is a further alternative embodiment of an electronic credit card in accordance with the present invention;

Referring to FIG. 1, there is shown an electronic credit card including a user verifier; a code generator for generating a unique code (not shown); a storage for storing the user's account details (not shown); and a communicator. In this embodiment the user verifier includes a keypad for entry of a personal identification number (PIN) and the communicator includes a infra red communication device 5, a magnetic induction telecommunication device 6, or radio frequency telecommunication device in the form of an antenna 7. The electronic credit card also includes a display 2, an enter/confirmation button and an audio transducer 4 for providing an audible sound.

The electronic card also includes a processor for receiving input from the keypad 1 and the button 3. The processor is also arranged to control output of the display 2 and output of the audio transducer 4. The processor is further arranged to control communication via the communicator 5, 6, 7. The storage is typically in the form of non-volatile random access memory, such as FLASH RAM or other suitable memory. The processor may be for example an embedded RISC processor, such as for example one of the ARM SecuriCore family of smart card processors or a processor using the SMARTMIPs architecture, or similar, or a proprietary designed processor.

The keypad in combination with firmware control of the processor forms the user verification means. The processor under the control of firmware forms the code generator for generating the unique authorization code. The unique authorization code may comprise a unique transaction identifier, such as a number generated according to a time/date stamp or counter and/or secret-key seeded non repeating number generating algorithm, that the number and/or code does not repeat within the lifetime of the electronic credit card. The infra red communication device, magnetic communication device, or radio frequency communication device under the control of firmware control of the processor forms the communicator. The firmware may be stored in the storage and may be reprogrammed.

The electronic credit card operates by a user entering a security code, such as a PIN number into the keypad 1 whereby the user verifier verifies that the PIN number is correct and thus the identity of the user is verified. The code generator for generating unique authorization code then generates the authorization code from the unique transaction identifier and/or the security codes. In one embodiment the unique authorization code is a function of the transaction identifier and the security code. The unique authorization code is provided along with the user's account details, to the communicator which non visually communicates these to a transaction station to facilitate an electronic funds transfer transaction. In an alternative form the security code is derived from a user biometric reading or activated when a known biometric reading is received by checking the biometric reading locally with one stored in the electronic credit card or remotely with biometric reading stored in a database in an external system.

The transaction station in combination with an electronic funds transfer system host computer must be configured to only continue with the electronic funds transfer transaction upon the receipt of the unique authorization code and account details. Each transaction can only be authorized when the unique authorization code is sent to the host computer by the transaction station.

Referring to FIG. 2, communication between the electronic credit card is shown with a transceiver device which talks with a personal computer. The transceiver device and personal computer act, in this example as the transaction station. The transaction station may then communicate via wire or wireless communications to computer networks, such as the Internet to a host computer in order for conducting the electronic funds transfer transaction.

Referring to FIG. 3, the electronic credit card communicates by it's communication means with an automatic teller machine (ATM) or an electronic funds transfer point of sale (EFTPOS) machine, which in turn communicates via standard methods to the host computer to perform electronic funds transfer, cash withdrawal or other transaction.

FIG. 4 shows a typical physical form of an electronic credit card with a keypad input device as the user verifier, and infra red receiver as part of the communicator.

FIG. 5 shows a version of the electronic credit cards with a keypad forming part of the user verifier and radio frequency antenna forming part of the communicator.

FIG. 6 shows a version of the electronic credit card with a keypad forming part of the user verifier and magnetic induction communication device 6 forming part of the communicator.

FIG. 7 shows a version of the electronic credit card with a keypad forming part of the user verifier and a wire contact 8 forming part of the communicator.

FIG. 8 shows a version of the electronic credit card with a keypad acting as part of the user verifier and a magnetic strip 9 shown in FIG. 9 providing coded information or account information as part of the communicator.

FIG. 10 shows a version of the electronic credit card with a keypad 1 forming part of the user verifier, a combination of infra red transmitter receiver 5, radio frequency antenna 7 and induction 6 forming part of the communicator.

Referring to FIG. 11, a version of the electronic credit card with a fingerprint scanner input device 10 forming part of the user verifier and an infra red transmitter receiver 5, radio frequency antenna 7 and indication means 6 forming part of the communicator.

Referring to FIG. 12, an embodiment of the electronic credit card including an eyeball or retina scanner pad 11 which forms part of the user verifier and an infra red transmitter 5, radio frequency antenna 7 and a magnetic induction device 6 form part of the communicator.

Use of the electronic credit card will prevent merchants from accessing an unauthorised transaction code as each transaction can only be generated by a unique transaction identifier by the electronic credit card. The unique authorization code is kept secret so as it is not provided to the merchant. A merchant cannot generate a unique transaction code. The electronic credit card verifies the identity of the user before it is activated. The electronic credit card can be disabled if a predetermined number of attempts to gain access to its operation fail and this will prevent fraud in the event that an electronic credit card is stolen. An authorising distributor or other authorised body could re-initialise the electronic credit card through a controlled management system used to issue the electronic credit card.

The electronic credit card can be disabled at a transaction station through a system control function by the issuing company or organisation. This will enable immediate termination or disablement of the electronic credit card if required. Electronic credit card may download information to a computer system via one of its telecommunication modes. This will ensure data integrity at a time when power source replacement or re-charging. Furthermore it will also facilitate transactional history download.

The electronic credit card may generate its unique transaction identifier number, which may be either in synchronisation with the transfer station link to a remote site system control function. The transaction station may be an Internet site with this capability.

The electronic credit card financial limit can be verified by the transaction station with a link to a remote site system. This will prevent the electronic credit card from generating further transactions once the financial limit is reached. The funds limiting function is optional and may be activated by either the financial institution issuing the electronic credit card or by the holder to cross-check and either alert him or her of his or her account balance. The electronic credit card may transact electronic cash which can be used as a currency exchange device. A traveler going abroad can choose to have a set amount for a specific currency of a particular country that he or she is visiting. The electronic credit card may be incorporated into another electronic device or piece of equipment, for example it may have been incorporated in a mobile phone.

An audio transducer is used to confirm a successful process of successful verification of the user and may also be used to provide communication over a telephone network.

A self-contained timer deactivates the user verification after a predetermined lapsed amount of time by deactivating an authorization code. This feature eliminates a stolen electronic credit card from being used when the user identification has already been verified.

The electronic credit card keypads may be made from flexible board membrane, rubber and/or plastics material to provide durability and in a slim size. The keypad may be designed with round, square or other shaped buttons.

The electronic credit card can store more than one credit card/debit card accounts. These can be cards distributed from different financial institutions, organisations or companies. The electronic credit card can retain amounts of transactions conducted by the user, with information regarding his or her financial balance in relation to the account limit. This may be available for one or more credit card accounts.

Modifications and variations may be made to the present invention without departing from the basic inventive concepts. The nature of such modifications and variations are to be determined within the scope of the present invention as defined by the foregoing description and appended claims.

What is claimed is:

1. An electronic credit card comprising:
a user verifier for verifying a user's identity;
a code generator for generating a unique authorization code when the user's identity is verified;
a storage for storing the user's account which comprises at least one account for use in an electronic funds transfer transaction; and
a communicator for non-visually communicating the details of the user's at least one account and the unique authorization code to a transaction station in order to facilitate an electronic funds transfer transaction.

2. An electronic credit card in accordance with claim 1, wherein the electronic credit card further comprises a timer for ending the verification of the user's identity after a period of time after the credit card has been verified.

3. An electronic credit card in accordance with claim 1, wherein the electronic credit card further comprises a disabler for disabling use of the electronic credit card under certain conditions including instructions set by the user.

4. An electronic credit card in accordance with claim 3, wherein the electronic credit card can be disabled when activated remotely by an issuer of the electronic credit card or other authority including commands of such action by way of synchronization between the electronic credit card and the transaction station, so that the electronic credit card can not be ordinarily re-enabled.

5. An electronic credit card in accordance with claim 3, wherein the disabler operates when a predetermined number of attempts verify the identity of the user fail.

6. An electronic credit card in accordance with claim 1, wherein the communicator is configured such that the unique authorization code is secretly communicated to the transaction station such that it is not communicated to a merchant.

7. An electronic credit card in accordance with claim 1, wherein the code generator is configured to generate the unique authorization code by combining a unique transaction identifier with a user identifier.

8. An electronic credit card in accordance with claim 7, wherein the user identifier is a personal identification number.

9. An electronic credit card in accordance with claim 7, wherein the user identifier is derived from a biometric reading of the user.

10. An electronic credit card in accordance with claim 1, wherein the user verifier comprises a keypad for a personal identification number (PIN) entry and PIN verifier to authenticate the identity of the user.

11. An electronic credit card in accordance with claim 1, wherein the user verifier comprises a fingerprint reader for reading a fingerprint and a fingerprint verifier means for verifying the identity of the user.

12. An electronic credit card in accordance with claim 1, wherein the user verifier comprises a retina scanner for scanning a retina pattern and a retina pattern verifier means for verifying the identity of the user.

13. An electronic credit card in accordance with claim 1, wherein the communicator is configured to electronically, magnetically or optically transmit the authorization code as a signal to the transaction station.

14. An electronic credit card in accordance with claim 1, wherein the communicator comprises an infrared transmitter.

15. An electronic credit card in accordance with claim 1, wherein the communicator comprises a radio frequency transmitter.

16. An electronic credit card in accordance with claim 1, wherein the communicator comprises a magnetic induction transfer device.

17. An electronic credit card in accordance with claim 1, wherein the communicator comprises a wire contact.

18. An electronic credit card in accordance with claim 1, wherein the storage and communicator are partly in the form of a magnetic strip for storing the account details and communication of the account details to the transaction station.

19. An electronic credit card in accordance with claim 1, wherein the communicator comprises a telephone network interface.

20. An electronic credit card in accordance with claim 1, wherein the storage means includes a financial limit for transactions for which the credit card can be used.

21. An electronic credit card in accordance with claim 1, wherein the storage stores more than one account.

22. An electronic credit card in accordance with claim 1, further comprising a processor to calculate the funds available based on electronic cash and transaction information.

23. A method of conducting an electronic funds transfer transaction using an electronic card comprising:
receiving an input from a user at the electronic card;
verifying the identity of the user from the input;
generating a unique transaction identifier when the user's identity is verified;
communicating the unique transaction identifier and the details of at least one user account and the unique authorization code stored in the electronic card from the electronic card to a transaction station in a non-visual form in order to facilitate an electronic fund transfer transaction.

24. A method in accordance with claim 23, further comprising ending the verification of the user's identity after a period of time after the credit card has been verified.

25. A method in accordance with claim 23, further comprising disabling use of the electronic credit card under certain conditions including instructions set by the user.

26. A method in accordance with claim 25, wherein the certain conditions comprises a predetermined number of attempts to verify the identity of the user fail.

27. A method in accordance with claim 23, wherein the step of communicating the unique authorization code is to the transaction station such that it is not communicated to the merchant.

28. A method in accordance with claim 23, wherein the unique authorization code is generated by combining a unique transaction identifier with a user identifier.

29. A method in accordance with claim 28, wherein the user identifier is input to the card as personal identification number.

30. A method in accordance with claim 28 further comprising obtaining a biometric reading from the user and using the biometric reading as the user identifier.

31. A method in accordance with claim 23, wherein verifying the identity of the user comprises receiving a personal identification number (PIN) and authenticating the PIN to the identity of the user.

32. A method in accordance with claim 23, wherein verifying the identity of the user comprises reading a fingerprint of the user.

33. A method in accordance with claim 23, wherein verifying the identity of the user comprises scanning a retina pattern of the user.

34. A method in accordance with claim 23, wherein communicating the unique transaction identifier comprises electronically, magnetically or optically transmitting a signal to the transaction station representing the unique transaction identifier.

35. A method in accordance with claim 23, wherein more than one user account is communicated in the communicating step.

36. An electronic card comprising:
an input device for receiving a user input to enable verifying a user's identity;
an output device for non-visually communicating with a transaction station;
a processor configured to generate a unique authorization code when the user's identity is verified;
the processor configured to retrieve stored details of at least one user account for use in an electronic funds transfer transaction; and
the processor also configured to transfer the generated unique authorization code and the details of the at least one user account to the transaction station via the output device.

37. The electronic card in accordance with claim 36, wherein the processor in configured to retrieve stored details of more than one account.

38. An electronic credit card in accordance with claim 20, which further comprises an electronic communications device, wherein the electronic credit card is programmed to verify the stored financial limit available to the user via a link to a remote site system to prevent the electronic credit card from generating further transactions once the financial limit is reached, wherein the funds limiting function can optionally be activated by either a financial institution issuing the electronic credit card or by the user.

39. An electronic credit card in accordance with claim 38, wherein the electronic communications device further comprises an audio transducer to confirm a successful verification of the user to provide communications over a telephone network.

40. A method of conducting an electronic funds transfer transaction which comprises:

receiving an input from a user from another device;

verifying the identity of the user from the input;

generating a unique transaction identifier when the user's identity is verified; and communicating the unique transaction identifier and the user's account details stored in the other device and electronic credit card from the other device to a transaction station;

wherein the communicating of the unique transaction identifier and the user's account details is communicated in a non-visual form.

41. An electronic credit card or another device which comprises:

an input device for receiving a user input to enable verifying a user's identity;

an output device for non-visually communicating the details of the user's at least one account and the unique authorization code to a transaction station in order to facilitate an electronic funds transfer transaction;

a processor configured to generate a unique authorization code when the user's identity is verified;

the processor configured to retrieve a stored user's account details including at least one account, electronic cash and transaction details for use in an electronic funds transfer transaction; and the processor also configured to transfer the generated unique authorization code and user account details to the transaction station via the output device.

42. A method of conducting an electronic funds transfer transaction which comprises:

receiving an input from a user from another device;

verifying the identity of the user from the input;

generating a unique transaction identifier when the user's identity is verified; and communicating the unique transaction identifier and the user's account details stored in the other device and electronic credit card from the other device to a transaction station;

wherein the transaction station is an automatic teller machine (ATM) or an electronic funds transfer point of sale (EFTPOS) machine to the host computer to perform electronic funds transfer, cash withdrawal or other transaction; and wherein the electronic credit card is incorporated into another device, such as a mobile phone, which comprises:

the capability to transact electronic cash which can be used as a currency exchange device; and the user can set an amount of a specific currency of a particular country to be used in the event of a visit to that particular country.

* * * * *